(12) United States Patent
Ujikawa et al.

(10) Patent No.: US 12,225,333 B2
(45) Date of Patent: Feb. 11, 2025

(54) OPTICAL COMMUNICATION SYSTEM, MONITORING DEVICE, AND MONITORING METHOD

(71) Applicant: NIPPON TELEGRAPH AND TELEPHONE CORPORATION, Tokyo (JP)

(72) Inventors: Hirotaka Ujikawa, Musashino (JP); Tomoya Hatano, Musashino (JP); Yuka Okamoto, Musashino (JP); Sei Kou, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 162 days.

(21) Appl. No.: 18/024,857

(22) PCT Filed: Sep. 11, 2020

(86) PCT No.: PCT/JP2020/034558
§ 371 (c)(1),
(2) Date: Mar. 6, 2023

(87) PCT Pub. No.: WO2022/054250
PCT Pub. Date: Mar. 17, 2022

(65) Prior Publication Data
US 2023/0362520 A1 Nov. 9, 2023

(51) Int. Cl.
*H04Q 11/00* (2006.01)
*H04B 10/032* (2013.01)
*H04L 41/0677* (2022.01)

(52) U.S. Cl.
CPC ....... *H04Q 11/0067* (2013.01); *H04B 10/032* (2013.01); *H04Q 11/0005* (2013.01);
(Continued)

(58) Field of Classification Search
CPC ............. H04B 10/032; H04Q 11/0067; H04Q 11/0005; H04Q 2011/0015;
(Continued)

(56) References Cited

U.S. PATENT DOCUMENTS 6,163,527 A * 12/2000 Ester .................. H04J 14/0295
370/227
6,351,582 B1 * 2/2002 Dyke .................. H04B 10/272
385/24
(Continued)

FOREIGN PATENT DOCUMENTS

JP 2010171652 A 8/2010

OTHER PUBLICATIONS

NTT Access Network Service Systems Laboratories, Technical Basic Lecture [GE-PON Technologies] Part 2 IEEE 802.3ah Standard, NTT Technical Journal, vol. 17, No. 9, 2005, pp. 91-94.
(Continued)

*Primary Examiner* — Dalzid E Singh
(74) *Attorney, Agent, or Firm* — Harness, Dickey & Pierce, P.L.C.

(57) ABSTRACT

An optical communication system includes a looped path in which an active trunk fiber and a standby trunk fiber are connected in a loop. A plurality of optical combining/splitting units is provided on an active trunk fiber in series, and a plurality of slave devices is connected the plurality of optical combining/splitting units, respectively. A master device performs optical communication with each slave device. Each optical combining/splitting unit includes an optical sensor configured to detect an optical signal passing through an optical fiber and a transmitter. The transmitter determines whether or not there is an abnormality in optical communication on the basis of a detection state of the optical signal and transmits an abnormality notification including
(Continued)

identification information of the optical combining/splitting unit to a monitoring apparatus in a case where there is an abnormality. The monitoring apparatus holds connection relationship information indicating a connection relationship between the plurality of optical combining/splitting units along the active trunk fiber. In a case where the monitoring apparatus receives the abnormality notification from at least one of the plurality of optical combining/splitting units, the monitoring apparatus specifies a failure position on a communication path on the basis of identification information of each optical combining/splitting unit that has transmitted the abnormality notification and the connection relationship information.

8 Claims, 13 Drawing Sheets

(52) U.S. Cl.
CPC .. *H04L 41/0677* (2013.01); *H04Q 2011/0015* (2013.01); *H04Q 2011/0081* (2013.01); *H04Q 2011/0083* (2013.01); *H04Q 2011/0092* (2013.01)

(58) Field of Classification Search
CPC ... H04Q 2011/0081; H04Q 2011/0083; H04Q 2011/0092; H04L 41/0677

USPC .......................................................... 398/3
See application file for complete search history.

(56) References Cited

U.S. PATENT DOCUMENTS

| | | | |
|---|---|---|---|
| 7,936,990 B2* | 5/2011 | Yan | H04J 14/0291 398/19 |
| 2008/0292310 A1* | 11/2008 | Li | H04J 14/0205 398/5 |
| 2014/0226966 A1* | 8/2014 | Lutgen | H04B 10/032 398/5 |
| 2015/0055945 A1* | 2/2015 | Wellbrock | H04J 14/0294 398/2 |

OTHER PUBLICATIONS

Hisashi Izumita and Toshio Kurashima, Group 5 (communications/broadcasting)—vol. 2 (optical access line/transmission technology)—Chapter 6 Optical line maintenance technology, The Institute of Electronics, Information and Communication Engineers "Knowledge Base", Group 5—vol. 2-Chapter 6 Ver.2, Jun. 26, 2018, http://www.ieice-hbkb.org/files/05/05gun_02hen_06.pdf.

* cited by examiner

Fig. 6

| PON BRANCH | IDENTIFICATION INFORMATION | IDENTIFICATION INFORMATION OF UPSTREAM OPTICAL COMBINING/SPLITTING UNIT | IDENTIFICATION INFORMATION OF DOWNSTREAM OPTICAL COMBINING/SPLITTING UNIT | ABNORMALITY NOTIFICATION YES/NO | ACTIVE/ STANDBY |
|---|---|---|---|---|---|
| CT#1 | 1 | 0 | 2 | | ACTIVE |
| CT#1 | 2 | 1 | 3 | | ACTIVE |
| CT#1 | 3 | 2 | 4 | | ACTIVE |
| ... | ... | ... | ... | ... | ... |
| CT#1 | n | n-1 | 0 | | ACTIVE |

Fig. 10

| PON BRANCH | IDENTIFICATION INFORMATION | IDENTIFICATION INFORMATION OF UPSTREAM OPTICAL COMBINING/SPLITTING UNIT | IDENTIFICATION INFORMATION OF DOWNSTREAM OPTICAL COMBINING/SPLITTING UNIT | ABNORMALITY NOTIFICATION YES/NO | ACTIVE/ STANDBY |
|---|---|---|---|---|---|
| CT#1 | 1 | 0 | 2 | NO | ACTIVE |
| CT#1 | 2 | 1 | 3 | NO | STANDBY |
| CT#1 | 3 | 2 | 4 | NO | STANDBY |
| ... | ... | ... | ... | ... | ... |
| CT#1 | n | n-1 | 0 | NO | STANDBY |

UPDATE (columns: Abnormality Notification, Active/Standby)

Fig. 12

| PON BRANCH | IDENTIFICATION INFORMATION | IDENTIFICATION INFORMATION OF UPSTREAM OPTICAL COMBINING/SPLITTING UNIT | IDENTIFICATION INFORMATION OF DOWNSTREAM OPTICAL COMBINING/SPLITTING UNIT | ABNORMALITY NOTIFICATION YES/NO | ACTIVE/ STANDBY |
|---|---|---|---|---|---|
| CT#1 | 1 | 0 | 2 | NO | ACTIVE |
| CT#1 | 2 | 1 | 3 | YES | STANDBY |
| CT#1 | 3 | 2 | 4 | NO | STANDBY |
| ... | ... | ... | ... | ... | ... |
| CT#1 | n | n-1 | 0 | NO | STANDBY |

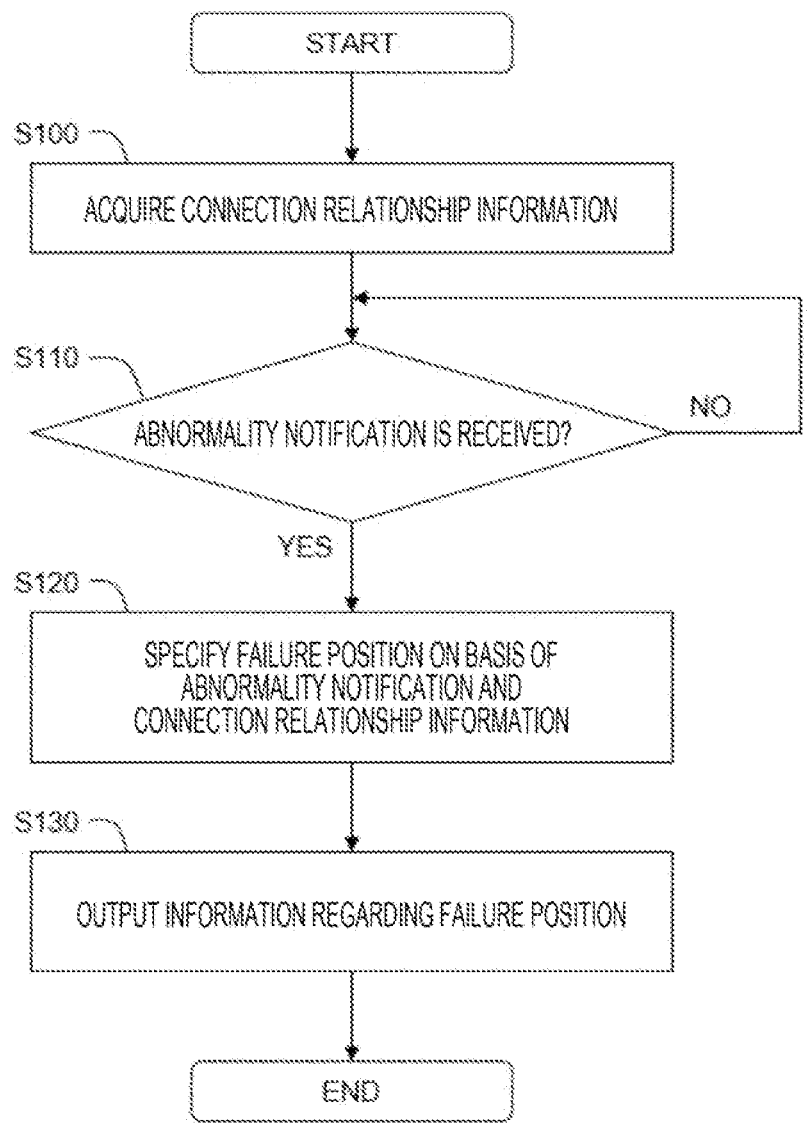

OPTICAL COMMUNICATION SYSTEM, MONITORING DEVICE, AND MONITORING METHOD

CROSS-REFERENCE TO RELATED APPLICATIONS

This application is a 371 U.S. National Phase of International Application No. PCT/JP2020/034558, filed on Sep. 11, 2020. The entire disclosure of the above application is incorporated herein by reference.

TECHNICAL FIELD

The present invention relates to an optical communication system and a technology for monitoring optical communication in the optical communication system.

BACKGROUND ART

A passive optical network (PON) system is known as an optical communication system (Non Patent Literature 1). In the PON system, an optical line termination or optical line terminal (OLT) and optical network units (ONUs) are connected by an optical fiber, and optical communication is performed between the OLT and the ONUs.

A maintenance technology for the optical communication system is one of important technologies in provision of optical communication services (Non Patent Literature 2). For example, a state of optical communication in the optical communication system is monitored. In a case where a communication failure occurs, it is necessary to find a cause of the communication failure and quickly recover the optical communication system.

Patent Literature 1 discloses a fault section estimation apparatus that estimates a fault section in the PON. When receiving a warning message from an ONU, the fault section estimation apparatus estimates that there is a fault in the ONU. Further, in a case where a communication disconnect occurs in a certain ONU, the fault section estimation apparatus monitors a fault in another ONU connected to the same optical splitter. In a case where a normal message is obtained from the another ONU, the fault section estimation apparatus estimates that there is a fault in an optical fiber on a downstream side of the optical splitter.

CITATION LIST

Patent Literature

Patent Literature 1: JP 2010-171652 A

Non Patent Literature

Non Patent Literature 1: GE-PON technology, NTT Technical Review, pp. 91 to 94, September 2005
Non Patent Literature 2: Optical Fiber Maintenance Technology, The Institute of Electronics, Information and Communication Engineers, "Knowledge base", part 5-chapter 2-section 6 Ver.2,2018/06/26, (http://www.ieice-hbkb.org/files/05/05gun_02hen_06.pdf)

SUMMARY OF INVENTION

Technical Problem

An optical communication system having a bus topology as a network topology of a master device and a plurality of slave devices will be considered. In a case of the bus topology, for example, when a trunk fiber is disconnected, communication with a large number of slave devices may be cut. In such a case, it is desired to quickly specify which part of the trunk fiber has been cut.

An object of the present invention is to provide a technology capable of specifying a failure position in a case where a communication failure occurs in an optical communication system having a bus topology.

Solution to Problem

A first aspect relates to an optical communication system. The optical communication system includes:
a looped path in which an active trunk fiber and a standby trunk fiber are connected in a loop;
a plurality of optical combining/splitting units provided on the active trunk fiber in series;
a plurality of slave devices connected to the plurality of optical combining/splitting units, respectively;
a master device connected to the looped path and configured to perform optical communication with each of the plurality of slave devices; and
a monitoring apparatus.

In a case where the active trunk fiber is normal, the standby trunk fiber is inactivated, and the active trunk fiber is used as a communication path of the optical communication.

In a case where a failure occurs in the active trunk fiber, the standby trunk fiber is activated, and the standby trunk fiber is also usable as the communication path of the optical communication.

Each of the plurality of optical combining/splitting units includes
an optical fiber through which an optical signal passes,
an optical sensor configured to detect the optical signal passing through the optical fiber, and
a transmitter configured to determine whether or not there is an abnormality in the optical communication on the basis of a detection state of the optical signal and transmit an abnormality notification including identification information of the optical combining/splitting unit to the monitoring apparatus in a case where there is the abnormality in the optical communication.

The monitoring apparatus includes
a memory configured to store connection relationship information indicating a connection relationship between the plurality of optical combining/splitting units along the active trunk fiber, and
a processor configured to, in a case where the processor receives the abnormality notification from at least one of the plurality of optical combining/splitting units, specify a failure position on the communication path on the basis of the identification information of each of the at least one optical combining/splitting unit that has transmitted the abnormality notification and the connection relationship information.

A second aspect relates to a monitoring apparatus in an optical communication system.

The optical communication system includes:
a looped path in which an active trunk fiber and a standby trunk fiber are connected in a loop;
a plurality of optical combining/splitting units provided on the active trunk fiber in series;
a plurality of slave devices connected to the plurality of optical combining/splitting units, respectively; and a master device connected to the looped path and configured to perform optical communication with each of the plurality of slave devices.

In a case where the active trunk fiber is normal, the standby trunk fiber is inactivated, and the active trunk fiber is used as a communication path of the optical communication.

In a case where a failure occurs in the active trunk fiber, the standby trunk fiber is activated, and the standby trunk fiber is also usable as the communication path of the optical communication.

Each of the plurality of optical combining/splitting units includes
- an optical fiber through which an optical signal passes,
- an optical sensor configured to detect the optical signal passing through the optical fiber, and
- a transmitter configured to determine whether or not there is an abnormality in the optical communication on the basis of a detection state of the optical signal and transmit an abnormality notification including identification information of the optical combining/splitting unit to the monitoring apparatus in a case where there is the abnormality in the optical communication.

The monitoring apparatus includes
- a memory configured to store connection relationship information indicating a connection relationship between the plurality of optical combining/splitting units along the active trunk fiber, and
- a processor configured to, in a case where the processor receives the abnormality notification from at least one of the plurality of optical combining/splitting units, specify a failure position on the communication path on the basis of the identification information of each of the at least one optical combining/splitting unit that has transmitted the abnormality notification and the connection relationship information.

A third aspect relates to a monitoring method executed by a computer in an optical communication system.

The optical communication system includes:
- a looped path in which an active trunk fiber and a standby trunk fiber are connected in a loop;
- a plurality of optical combining/splitting units provided on the active trunk fiber in series;
- a plurality of slave devices connected to the plurality of optical combining/splitting units, respectively; and
- a master device connected to the looped path and configured to perform optical communication with each of the plurality of slave devices.

In a case where the active trunk fiber is normal, the standby trunk fiber is inactivated, and the active trunk fiber is used as a communication path of the optical communication.

In a case where a failure occurs in the active trunk fiber, the standby trunk fiber is activated, and the standby trunk fiber is also usable as the communication path of the optical communication.

Each of the plurality of optical combining/splitting units includes
- an optical fiber through which an optical signal passes,
- an optical sensor configured to detect the optical signal passing through the optical fiber, and
- a transmitter configured to determine whether or not there is an abnormality in the optical communication on the basis of a detection state of the optical signal and transmit an abnormality notification including identification information of the optical combining/splitting unit to the monitoring apparatus in a case where there is the abnormality in the optical communication.

The monitoring method includes
- a step of acquiring connection relationship information indicating a connection relationship between the plurality of optical combining/splitting units along the active trunk fiber,
- a step of receiving the abnormality notification from at least one of the plurality of optical combining/splitting units, and
- a step of specifying a failure position on the communication path on the basis of the identification information of each of the at least one optical combining/splitting unit that has transmitted the abnormality notification and the connection relationship information.

Advantageous Effects of Invention

According to the present invention, it is possible to specify a failure position in a case where a communication failure occurs in an optical communication system having a bus topology.

BRIEF DESCRIPTION OF DRAWINGS

FIG. 6 is a conceptual diagram illustrating an example of connection relationship information in an embodiment of the present invention.

FIG. 10 is a conceptual diagram illustrating an example of connection relationship information after standby path activation processing according to an embodiment of the present invention.

FIG. 12 is a conceptual diagram illustrating an example of failure position specification processing after standby path activation processing according to an embodiment of the present invention.

FIG. 13 is a flowchart showing processing performed by a monitoring apparatus according to an embodiment of the present invention.

DESCRIPTION OF EMBODIMENTS

Embodiments of the present invention will be described with reference to the accompanying drawings.

1. Overview of Optical Communication System

Figure 1:
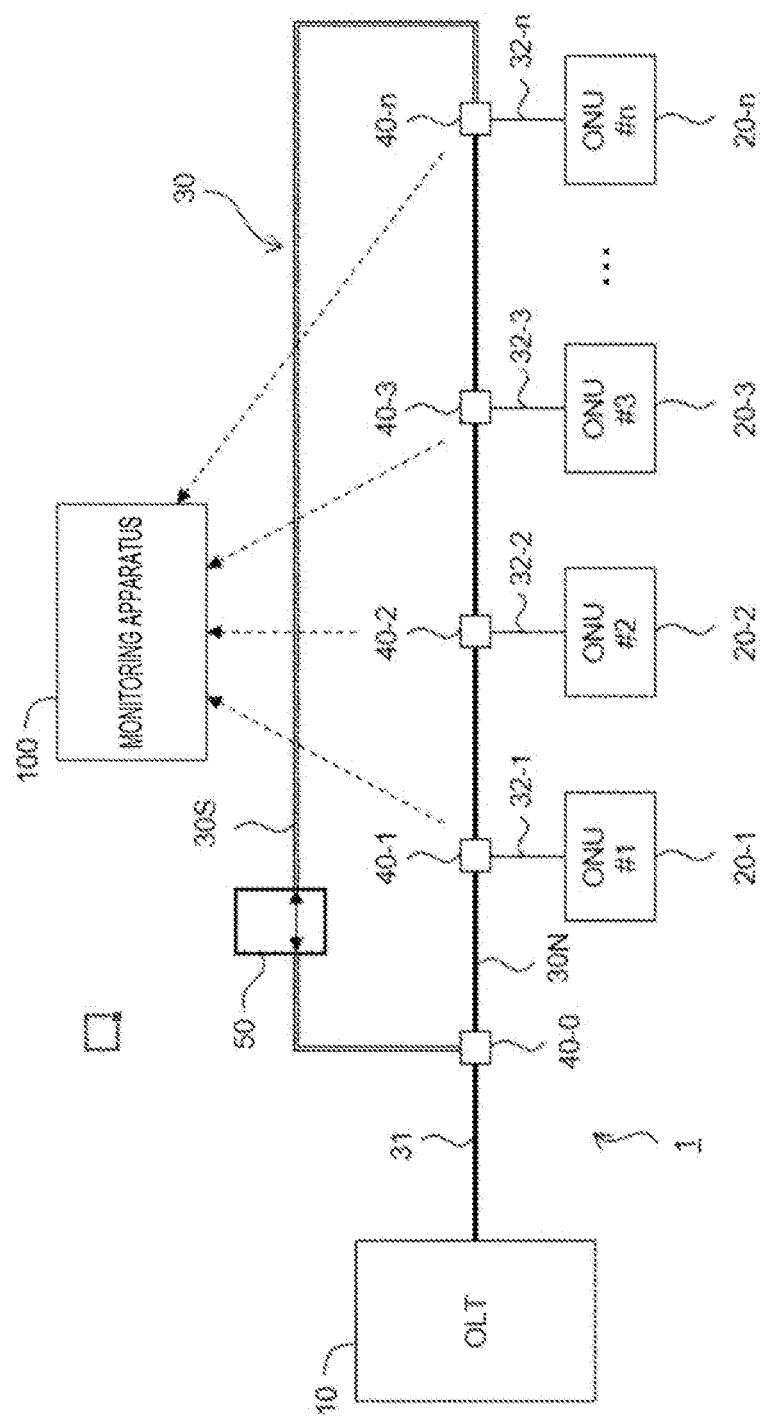
FIG. 1 is a conceptual diagram illustrating a configuration example of an optical communication system according to an embodiment of the present invention.

FIG. 1 is a conceptual diagram illustrating a configuration example of an optical communication system 1 according to the present embodiment. The optical communication system 1 includes a master device 10 and a plurality of slave devices 20. In the example of FIG. 1, the optical communication system 1 includes n slave devices 20-$i$ ($i$=1 to n). Herein, n denotes an integer of 2 or more. The master device 10 is connected to the plurality of slave devices 20 via an optical fiber and performs optical communication with each of the plurality of slave devices 20.

In the following description, the optical communication system 1 is a passive optical network (PON) system. The master device 10 will be referred to as "optical line termination or optical line terminal (OLT) 10" hereinafter. The slave devices 20 will be referred to as "optical network units (ONUs) 20" hereinafter.

In the present embodiment, a network topology of the OLT 10 and the ONUs 20 is a "bus topology". More specifically, as illustrated in FIG. 1, the optical communication system 1 includes a looped path 30. The looped path 30 is configured by connecting an active trunk fiber 30N and a standby trunk fiber 30S (redundant trunk fiber) in a loop.

The OLT 10 is connected to the looped path 30 via a trunk fiber 31. More specifically, an optical combining/splitting unit 40-0 is provided at a splitting point of the active trunk fiber 30N and the standby trunk fiber 30S. The OLT 10 is connected to the optical combining/splitting unit 40-0 via the trunk fiber 31. The optical combining/splitting unit 40-0 distributes an optical signal input from the trunk fiber 31 to the active trunk fiber 30N and the standby trunk fiber 30S. Further, the optical combining/splitting unit 40-0 outputs an optical signal input from the active trunk fiber 30N or the standby trunk fiber 30S to the trunk fiber 31.

The plurality of the ONUs 20-$i$ ($i$=1 to n) is connected to the active trunk fiber 30N in parallel. More specifically, the optical communication system 1 includes a plurality of optical combining/splitting units 40-$i$ ($i$=1 to n). The optical combining/splitting units 40-$i$ are, for example, optical couplers. The plurality of optical combining/splitting units 40-$i$ is provided on the active trunk fiber 30N in series (multiple stages). The plurality of ONUs 20-$i$ is connected to the plurality of optical combining/splitting units 40-$i$, respectively, via a plurality of branch fibers 32-$i$. Each of the optical combining/splitting units 40-$i$ distributes an optical signal input from the active trunk fiber 30N on one side to the active trunk fiber 30N on the other side and the branch fiber 32-$i$. Further, the optical combining/splitting unit 40-$i$ distributes an optical signal input from the branch fiber 32-$i$ to the active trunk fibers 30N on both sides.

An optical switch 50 is provided on the standby trunk fiber 30S. The optical switch 50 activates/inactivates the standby trunk fiber 30S by permitting/blocking passing of an optical signal through the standby trunk fiber 30S.

Figure 2:
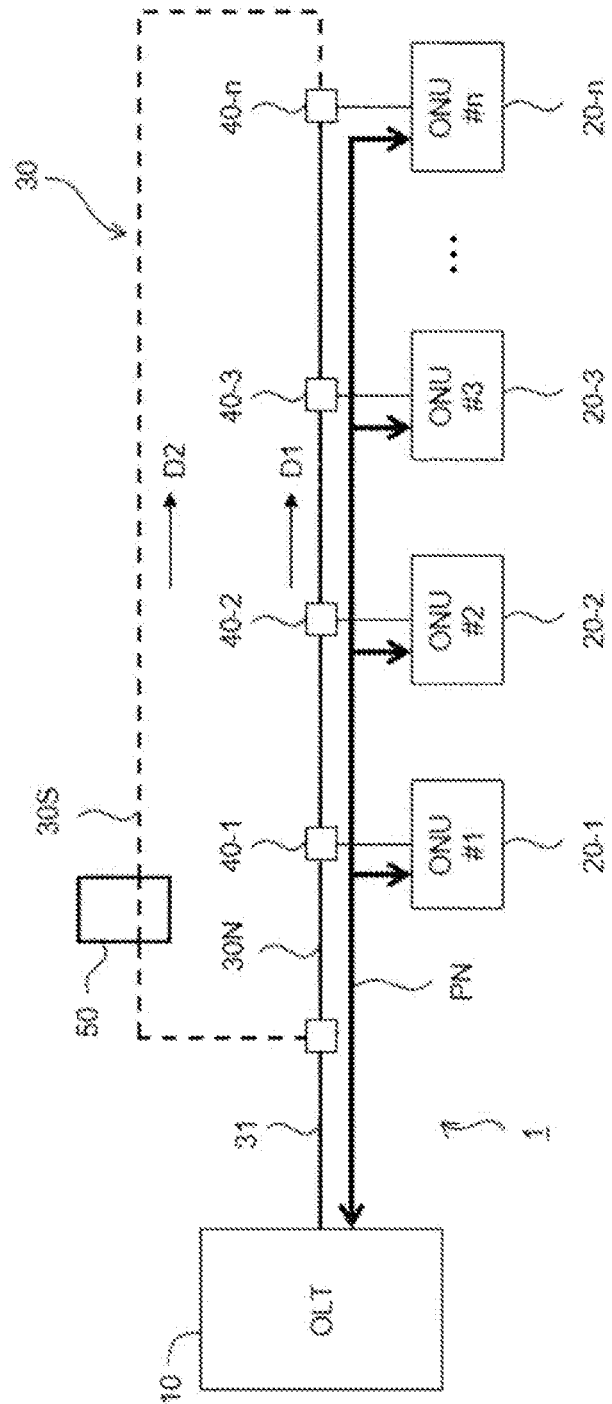
FIG. 2 is a conceptual diagram illustrating a normal operation of an optical communication system according to an embodiment of the present invention.

FIG. 2 is a conceptual diagram illustrating a normal operation of the optical communication system 1. In a case where the active trunk fiber 30N is normal, the optical switch 50 is set to block passing of an optical signal. Therefore, the standby trunk fiber 30S is inactivated. A communication path between the OLT 10 and each ONU 20 is a normal path PN using the active trunk fiber 30N. Considering a downward direction from the OLT 10 to each ONU 20, the normal path PN is a communication path along a first direction D1 in the looped path 30. The OLT 10 performs optical communication with each ONU 20 via the normal path PN.

Figure 3:
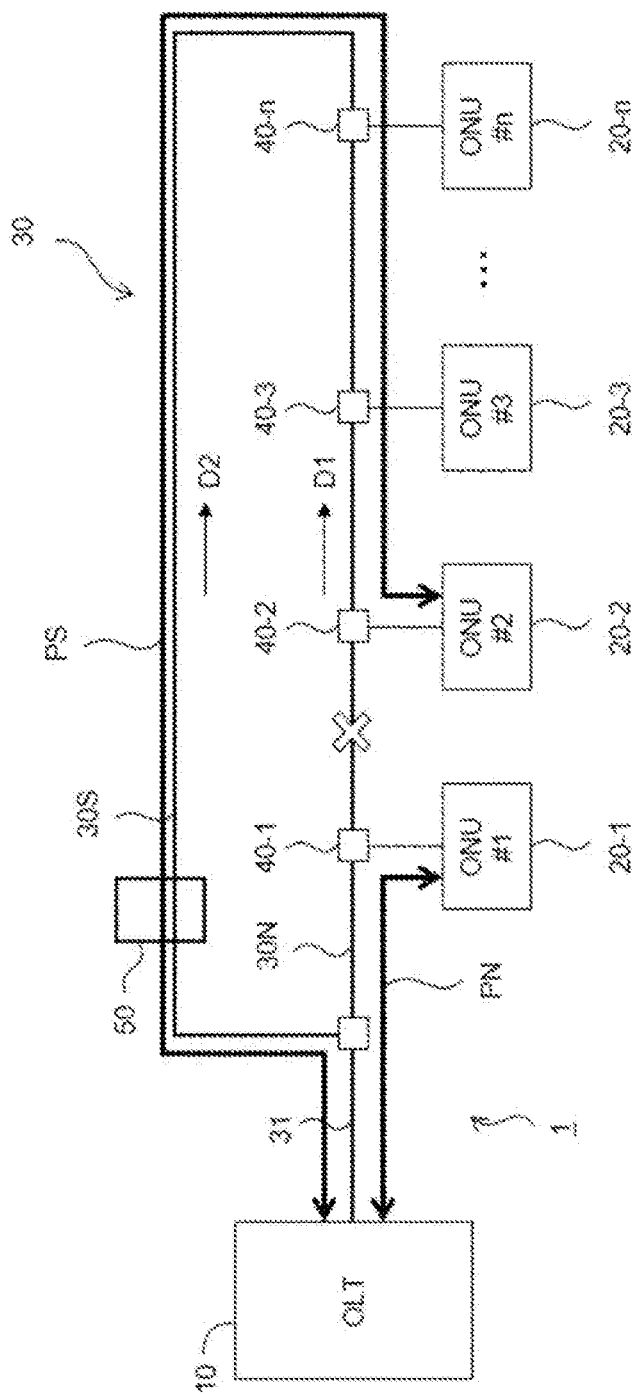
FIG. 3 is a conceptual diagram illustrating a situation where a failure occurs in an active trunk fiber of an optical communication system according to an embodiment of the present invention.

FIG. 3 is a conceptual diagram illustrating a situation where a failure (fiber cut) occurs in the active trunk fiber 30N. In the example of FIG. 3, the failure occurs in the active trunk fiber 30N between optical combining/splitting units 40-1 and 40-2. As a result, communication between ONUs 20-2 to 20-$n$ via the normal path PN is disconnected. According to the present embodiment, the standby trunk fiber 30S is used as a communication path in order to early restart the communication between the ONUs 20-2 to 20-$n$ without waiting for restoration of the active trunk fiber 30N. Specifically, the optical switch 50 is switched to permit passing of an optical signal. Therefore, the standby trunk fiber 30S is activated and becomes usable. A communication path between the OLT 10 and the ONUs 20-2 to 20-$n$ is a standby path PS using the standby trunk fiber 30S. The standby path PS is a communication path along a second direction D2 opposite to the first direction D1 in the looped path 30. As described above, in a case where the failure occurs in the active trunk fiber 30N, not only the normal path PN but also the standby path PS becomes usable. The OLT 10 performs communication with each ONU 20 via the normal path PN or the standby path PS.

The optical communication system 1 according to the present embodiment further includes a monitoring apparatus 100. The monitoring apparatus 100 monitors a state of optical communication in the optical communication system 1. In particular, the monitoring apparatus 100 specifies a failure position in a case where a communication failure occurs. Details of the monitoring apparatus 100 will be described later.

2. Configuration Example of Optical Combining/Splitting Unit

Figure 4:
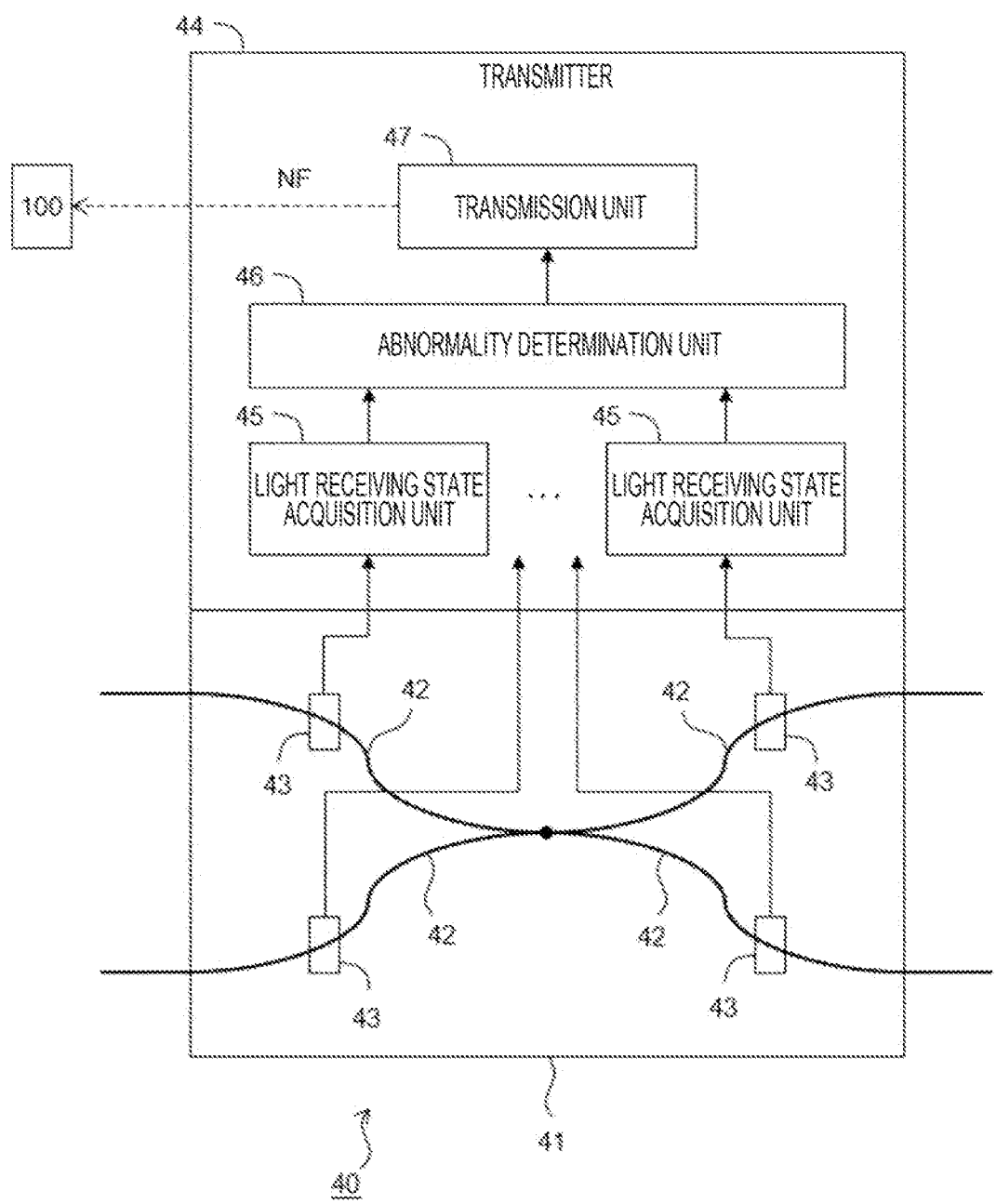
FIG. 4 is a schematic diagram illustrating a configuration example of an optical combining/splitting unit according to an embodiment of the present invention.

FIG. 4 is a schematic diagram illustrating a configuration example of the optical combining/splitting unit 40 according to the present embodiment. The optical combining/splitting unit 40 includes an optical combining/splitting unit main body 41, optical sensors 43, and a transmitter 44.

The optical combining/splitting unit main body 41 includes a plurality of optical fibers 42 through which optical signals pass. The plurality of optical fibers 42 is combined to split and combine light.

The optical sensor 43 is provided for each optical fiber 42. The optical sensor 43 detects an optical signal passing through the optical fiber 42. For example, the optical sensor 43 detects light leaking from the optical fiber 42 by using a photodiode or the like. As another example, the optical sensor 43 may include an optical splitter that splits an optical signal passing through the optical fiber 42 and a photodiode that converts the optical signal into an electrical signal. The optical sensor 43 outputs information indicating a detection result to the transmitter 44. The information indicating the detection result may be the electrical signal into which the detected optical signal is converted or may be the detected optical signal itself. The optical sensor 43 may always output the information indicating the detection result or may output the information at regular intervals.

The transmitter 44 determines whether or not there is an abnormality in optical communication on the basis of a state of an optical signal detected by the optical sensor 43. For example, the transmitter 44 determines that there is an abnormality in optical communication in a case where no optical signal is detected for a certain period of time. In a case where the transmitter determines that there is an abnormality in optical communication, the transmitter 44 transmits an abnormality notification NF to the monitoring apparatus 100. The abnormality notification NF includes identification information (ID) of the optical combining/splitting unit 40 that has detected the abnormality.

In the example of FIG. 4, the transmitter 44 includes light receiving state acquisition units 45, an abnormality determination unit 46, and a transmission unit 47.

The light receiving state acquisition unit 45 is provided for each optical sensor 43. The light receiving state acquisition unit 45 receives information indicating a detection result from the corresponding optical sensor 43. The light receiving state acquisition unit 45 acquires information regarding a light receiving state of the corresponding optical sensor 43 on the basis of the information indicating the detection result. The information regarding the light receiving state includes whether or not an optical signal has been detected. The information regarding the light receiving state may include an intensity of the optical signal. The light receiving state acquisition unit 45 outputs the information regarding the light receiving state of the corresponding optical sensor 43 to the abnormality determination unit 46.

The abnormality determination unit 46 determines whether or not there is an abnormality in optical communication on the basis of the information received from the light receiving state acquisition unit 45. For example, the abnormality determination unit 46 determines that there is an abnormality in optical communication in a case where no optical signal is detected by any of the optical sensors 43 for a certain period of time (optical signal loss). Alternatively, the abnormality determination unit 46 may determine that there is an abnormality in optical communication in a case where no optical signal is detected by one or more specific optical sensors 43 for a certain period of time. Note that the wording "no optical signal is detected" means that a received light intensity is equal to or less than a threshold. The abnormality determination unit 46 may perform determination processing at regular intervals.

In a case where the abnormality determination unit 46 determines that there is an abnormality in optical communication, the transmission unit 47 transmits the abnormality notification NF to the monitoring apparatus 100. For example, the transmission unit 47 transmits the abnormality notification NF to the monitoring apparatus 100 via a wireless communication network. Examples of the wireless communication network include a 4G network and a 5G network. In that case, the transmission unit 47 includes a wireless communication circuit. Alternatively, the transmission unit 47 may perform wired communication with the monitoring apparatus 100. Note that, in a case where it is determined that optical communication is normal, the transmission unit 47 may or may not transmit a normal notification.

The transmitter 44 is typically attached to the optical combining/splitting unit main body 41. The transmitter 44 may be detachable from the optical combining/splitting unit main body 41. The transmitter 44 is operated by power supplied from a built-in battery (not illustrated). Alternatively, the transmitter 44 may be connected to an external power supply.

The abnormality notification NF transmitted from the transmitter 44 of the optical combining/splitting unit 40 to the monitoring apparatus 100 includes the identification information of the optical combining/splitting unit 40. That is, the abnormality notification NF includes the identification information of the optical combining/splitting unit 40 that has determined that there is an abnormality in optical communication.

Note that each of the at least optical combining/splitting units 40-1 to 40-$n$ has the above-described configuration. Further, the optical combining/splitting unit 40-0 connected to the OLT 10 may have the same configuration.

3. Monitoring Apparatus

Hereinafter, the monitoring apparatus 100 of the optical communication system 1 according to the present embodiment will be described in detail.

3-1. Configuration Example

Figure 5:
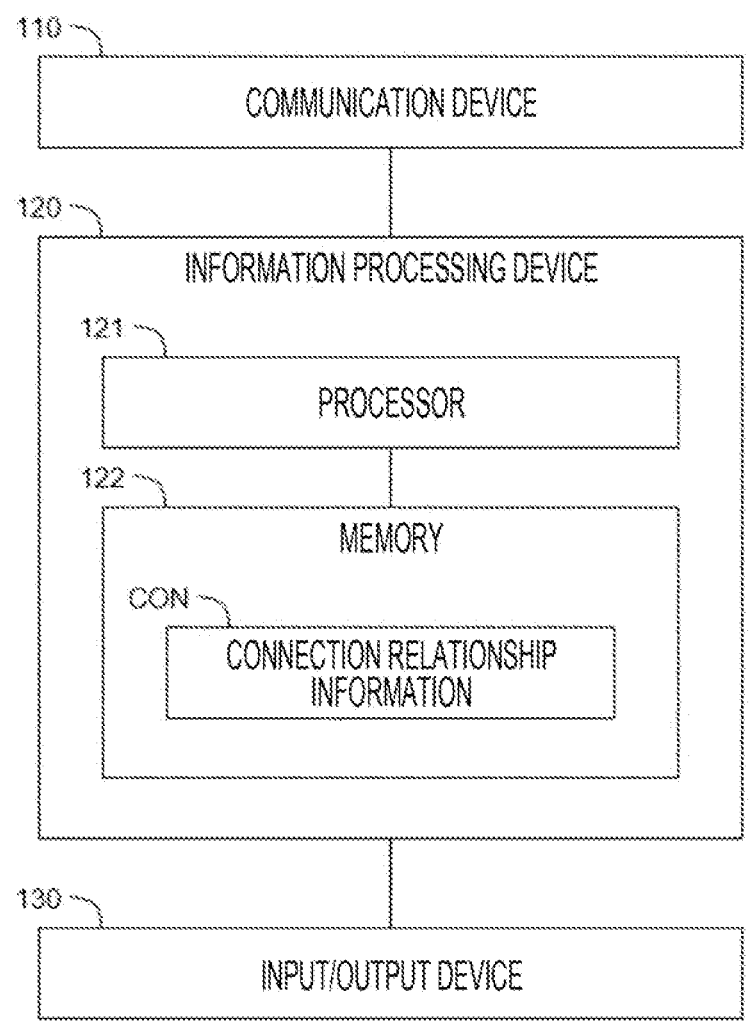
FIG. 5 is a block diagram illustrating a configuration example of a monitoring apparatus according to an embodiment of the present invention.

FIG. 5 is a block diagram illustrating a configuration example of the monitoring apparatus 100 according to the present embodiment. The monitoring apparatus 100 includes a communication device 110, an information processing device 120, and an input/output device 130.

The communication device 110 performs communication with outside of the monitoring apparatus 100. For example, the communication device 110 includes a receiver that receives the abnormality notification NF from the optical combining/splitting unit 40-$i$. For example, the communication device 110 performs communication with the optical combining/splitting unit 40-$i$ via a wireless communication network. Examples of the wireless communication network include a 4G network and a 5G network. In that case, the communication device 110 includes a wireless communication circuit. Alternatively, the communication device 110 may perform wired communication with the optical combining/splitting unit 40-$i$. Further, the communication device 110 may perform wireless or wired communication with the OLT 10.

The information processing device 120 is a computer that executes various kinds of information processing. The information processing device 120 includes a processor 121 and a memory 122. The processor 121 executes various kinds of information processing. For example, the processor 121 includes a central processing unit (CPU). As another example, the processor 121 may be implemented by an application specific integrated circuit (ASIC), a field programmable gate array (FPGA), or the like. The memory 122 stores various kinds of information and programs necessary for the processing performed by the processor 121. Examples of the memory 122 include a volatile memory, nonvolatile memory, hard disk drive (HDD), and solid state drive (SSD).

The input/output device 130 is an interface that provides information for an operator of the monitoring apparatus 100 and accepts information from the operator. For example, the input/output device 130 includes a display device such as a display or touchscreen. Further, the input/output device 130 may include an input device such as a keyboard or touchscreen. The input/output device 130 may include a universal serial bus (USB) connector.

3-2. Failure Position Specification Processing

The information processing device 120 (processor 121) of the monitoring apparatus 100 according to the present embodiment specifies a failure position in a case where a communication failure occurs in the optical communication system 1. This processing will be referred to as "failure position specification processing" hereinafter.

In the failure position specification processing, not only the above-described abnormality notification NF but also connection relationship information CON is used. The connection relationship information CON indicates a connection relationship between the plurality of optical combining/splitting units 40-$i$ (i=1 to n) along the active trunk fiber 30N. The connection relationship information CON is stored in the memory 122 of the information processing device 120.

Herein, a "standard upstream direction", a "standard downstream direction", an "upstream direction", and a "downstream direction" will be defined. The "standard upstream direction" is a direction toward the OLT 10 along the active trunk fiber 30N. Meanwhile, the "standard downstream direction" is a direction away from the OLT 10 along the active trunk fiber 30N and is a direction opposite to the standard upstream direction. The "upstream direction" is a direction toward the OLT 10 along the communication path. The upstream direction obtained in a case where the communication path is the normal path PN is the standard upstream direction. The upstream direction obtained in a case where the communication path is the standby path PS is the standard downstream direction. The "downstream direction" is a direction away from the OLT 10 along the communication path. The downstream direction obtained in a case where the communication path is the normal path PN is the standard downstream direction. The downstream direction obtained in a case where the communication path is the standby path PS is the standard upstream direction.

FIG. 6 is a conceptual diagram illustrating an example of the connection relationship information CON. The plurality of optical combining/splitting units 40-$i$ (i=1 to n) belongs to the same PON branch. In the example of FIG. 6, the connection relationship information CON has a table format and includes an entry regarding each of the plurality of optical combining/splitting units 40-$i$.

Each entry includes connection information regarding each optical combining/splitting unit 40-$i$. The connection information regarding the optical combining/splitting unit 40-$i$ includes identification information of the optical combining/splitting unit 40-$i$, identification information of an upstream optical combining/splitting unit 40-($i$−1), and identification information of a downstream optical combining/splitting unit 40-($i$+1). The upstream optical combining/splitting unit 40-($i$−1) is an optical combining/splitting unit 40 adjacent to the optical combining/splitting unit 40-$i$ in the standard upstream direction. That is, the upstream optical combining/splitting unit 40-($i$−1) is an optical combining/splitting unit 40 connected to the optical combining/splitting unit 40-$i$ in the standard upstream direction. The downstream optical combining/splitting unit 40-($i$+1) is an optical combining/splitting unit 40 adjacent to the optical combining/splitting unit 40-$i$ in the standard downstream direction. That is, the downstream optical combining/splitting unit 40-($i$+1) is an optical combining/splitting unit 40 connected to the optical combining/splitting unit 40-$i$ on the standard downstream side.

Each entry may further include notification state information indicating whether or not the abnormality notification NF has been received from each optical combining/splitting unit 40-$i$.

Each entry further includes communication path information. The communication path information indicates that a communication path for each optical combining/splitting unit 40-$i$ is the active trunk fiber (normal path PN) or standby trunk fiber (standby path PS).

Note that, in a case where the optical combining/splitting unit 40-0 also has the abnormality notification function in FIG. 4, the connection relationship information CON may include an entry regarding the optical combining/splitting unit 40-0.

The information processing device 120 (processor 121) receives the abnormality notification NF from at least one optical combining/splitting unit 40-$i$ via the communication device 110. The abnormality notification NF includes the identification information of the optical combining/splitting unit 40-$i$ that has transmitted the abnormality notification NF. When receiving the abnormality notification NF, the information processing device 120 specifies a failure position on the communication path on the basis of the identification information of the optical combining/splitting unit 40-$i$ included in the received abnormality notification NF and the above-described connection relationship information CON.

Figure 7:
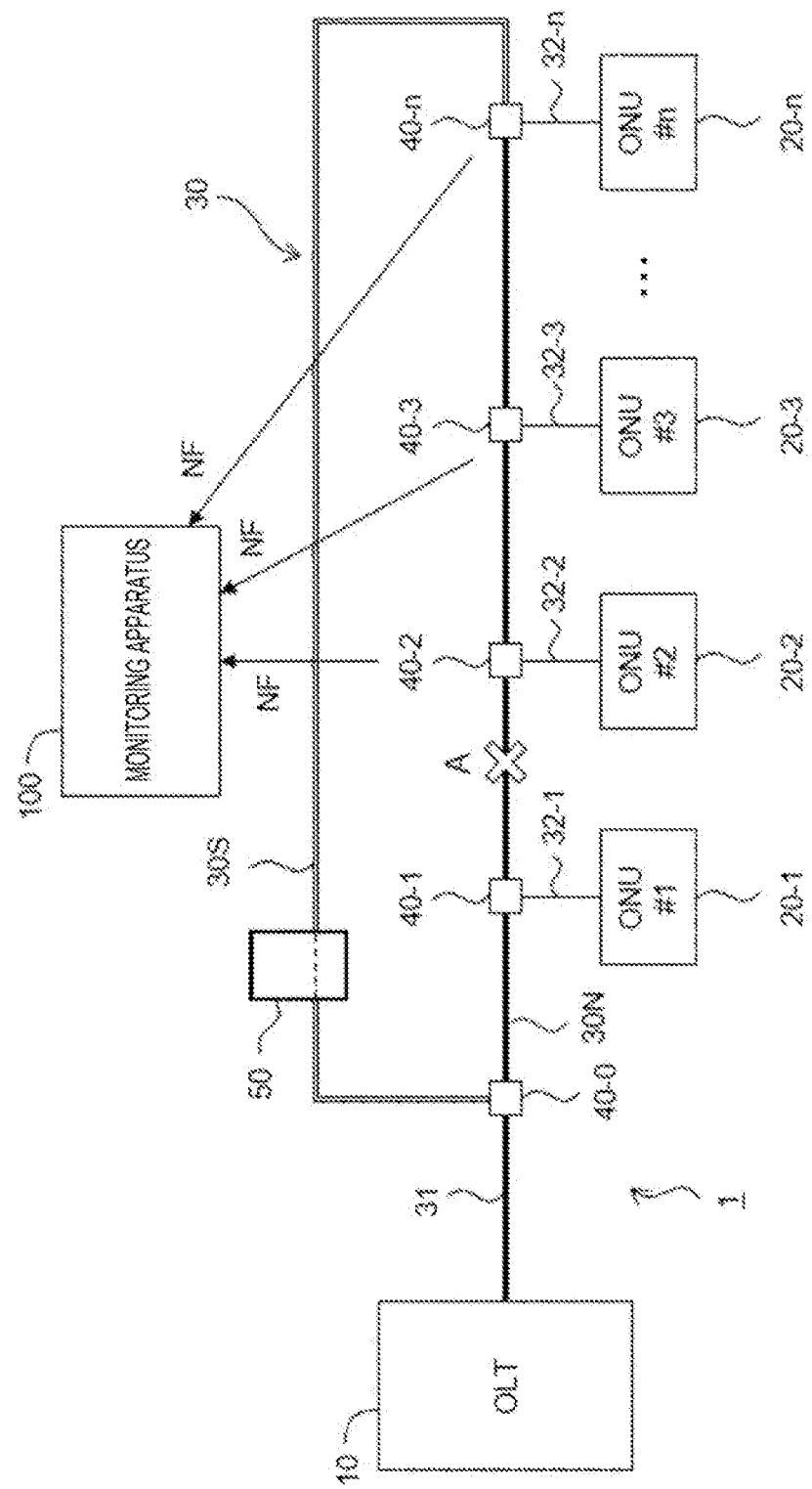
FIG. 7 is a conceptual diagram illustrating an example of failure position specification processing performed by a monitoring apparatus according to an embodiment of the present invention.

FIG. 7 is a conceptual diagram illustrating an example of the failure position specification processing. The standby trunk fiber 30S is inactivated. In the example of FIG. 7, a failure (fiber cut) occurs at a point A on the active trunk fiber 30N in a section between the optical combining/splitting unit 40-1 and the optical combining/splitting unit 40-2. In this case, each of the optical combining/splitting units 40-2 to 40-$n$ detects the abnormality in optical communication and transmits the abnormality notification NF. Meanwhile, the optical combining/splitting unit 40-1 does not transmit the abnormality notification NF. The abnormality notifications NF from the optical combining/splitting units 40-2 to 40-$n$ are received by the monitoring apparatus 100. The information processing device 120 gathers the abnormality notifications NF received from the optical combining/splitting units 40-2 to 40-$n$.

Based on the abnormality notifications NF and the connection relationship information CON, the information processing device 120 recognizes the optical combining/splitting unit 40-2 existing in the most upstream position among the optical combining/splitting units 40-2 to 40-$n$ that have transmitted the abnormality notifications NF. Further, based on the abnormality notifications NF and the connection relationship information CON, the information processing device 120 recognizes that the information processing device has not received the abnormality notification NF from the upstream optical combining/splitting unit 40-1 adjacent to the optical combining/splitting unit 40-2. Therefore, the information processing device 120 determines that the failure position exists in the section between the optical combining/splitting unit 40-1 and the optical combining/splitting unit 40-2.

Figure 8:
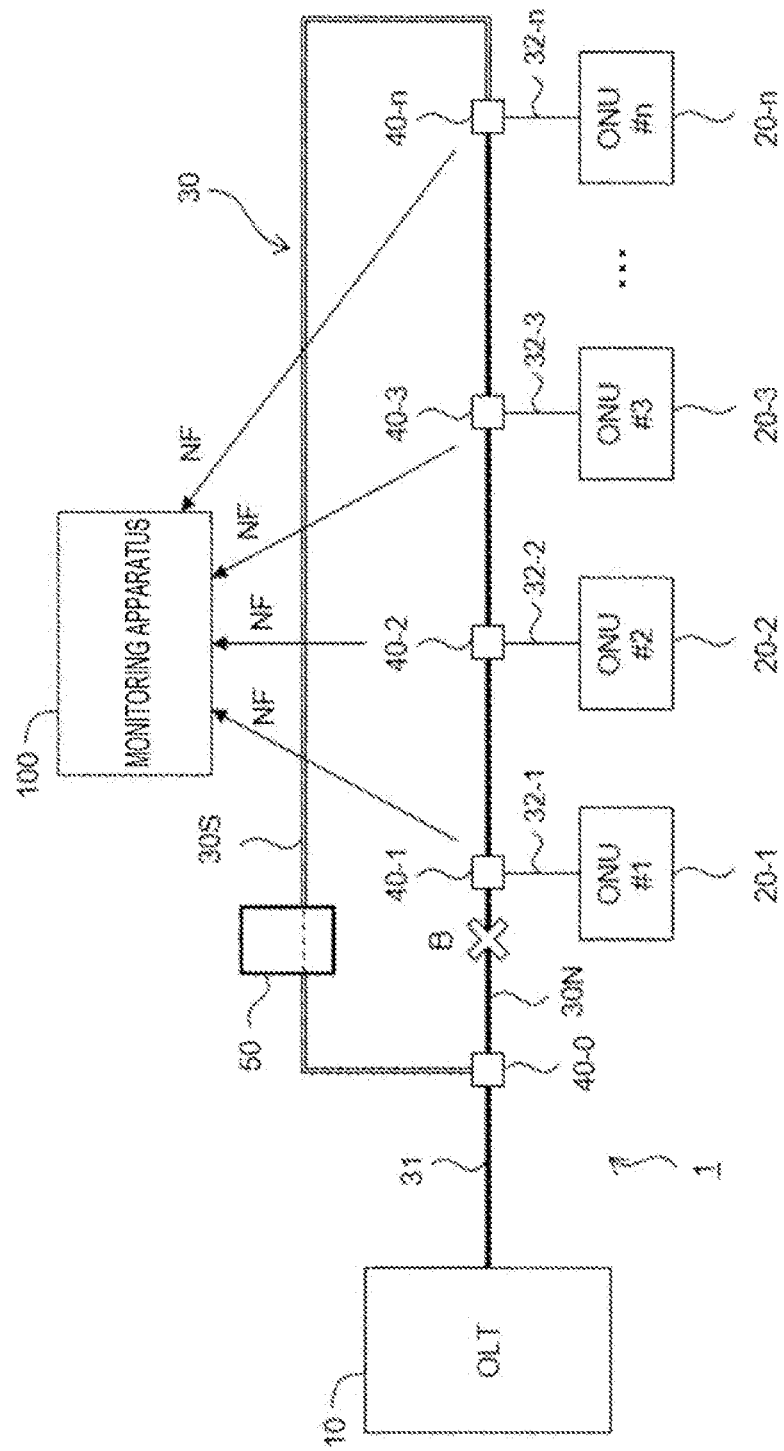
FIG. 8 is a conceptual diagram illustrating another example of failure position specification processing performed by a monitoring apparatus according to an embodiment of the present invention.

FIG. 8 is a conceptual diagram illustrating another example of the failure position specification processing. The standby trunk fiber 30S is inactivated. In the example of FIG. 8, a failure (fiber cut) occurs at a point B on the active trunk fiber 30N in a section between the optical combining/splitting unit 40-0 and the optical combining/splitting unit 40-1. In this case, each of the optical combining/splitting units 40-1 to 40-$n$ detects the abnormality in optical communication and transmits the abnormality notification NF. The abnormality notifications NF from the optical combining/splitting units 40-1 to 40-$n$ are received by the monitoring apparatus 100. The information processing device 120 gathers the abnormality notifications NF received from the optical combining/splitting units 40-1 to 40-$n$.

Based on the abnormality notifications NF and the connection relationship information CON, the information processing device 120 recognizes the optical combining/splitting unit 40-1 existing in the most upstream position among the optical combining/splitting units 40-1 to 40-n that have transmitted the abnormality notifications NF. In this case, the information processing device 120 determines that the failure position exists in the upstream direction from the optical combining/splitting unit 40-1. That is, the information processing device 120 determines that the failure position exists in a section between the OLT 10 and the optical combining/splitting unit 40-1.

In a case where the optical combining/splitting unit 40-0 also has the abnormality notification function in FIG. 4, the connection relationship information CON includes the entry regarding the optical combining/splitting unit 40-0. Based on the abnormality notifications NF and the connection relationship information CON, the information processing device 120 recognizes that the information processing device has not received the abnormality notification NF from the optical combining/splitting unit 40-0 adjacent to the optical combining/splitting unit 40-1. Therefore, the information processing device 120 determines that the failure position exists in the section between the optical combining/splitting unit 40-0 and the optical combining/splitting unit 40-1.

3-3. Standby Path Activation Processing

In a case where a failure occurs in the active trunk fiber 30N, the standby trunk fiber 30S (standby path PS) is activated. For example, when a failure position on the active trunk fiber 30N is specified, the information processing device 120 of the monitoring apparatus 100 activates the standby trunk fiber 30S. Specifically, the information processing device 120 performs communication with the optical switch 50 and operates the optical switch 50 so as to permit passing of an optical signal. As another example, the information processing device 120 may notify the OLT 10 that the failure has occurred in the active trunk fiber 30N. In that case, the OLT 10 performs communication with the optical switch 50 and operates the optical switch 50 so as to permit passing of an optical signal.

Figure 9:
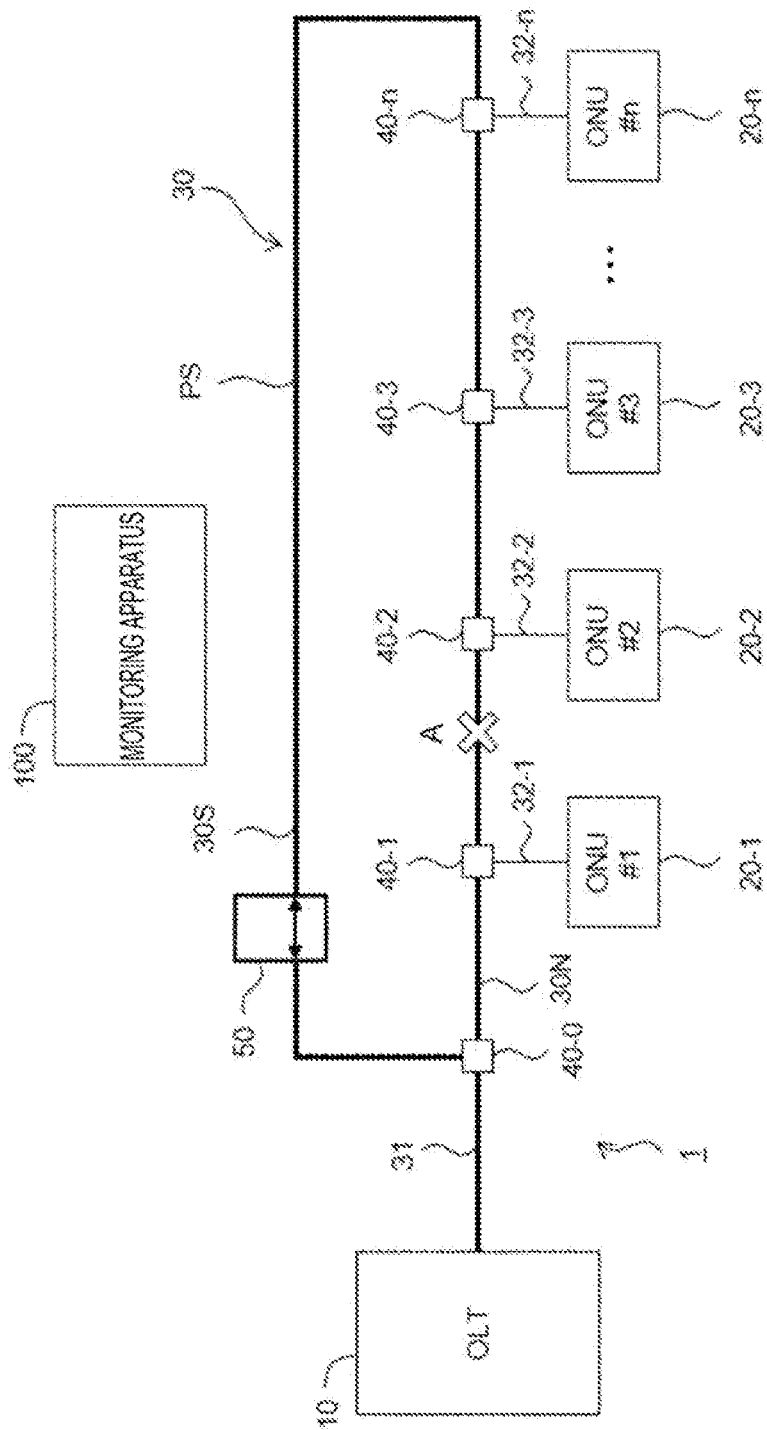
FIG. 9 is a conceptual diagram illustrating an example of standby path activation processing according to an embodiment of the present invention.

FIG. 9 illustrates standby path activation processing in the above situation of FIG. 7. The failure occurs at the point A between the optical combining/splitting unit 40-1 and the optical combining/splitting unit 40-2. In the situation, the standby trunk fiber 30S is activated. As a result, the communication path between the OLT 10 and the ONUs 20-2 to 20-n is switched from the active trunk fiber 30N (normal path PN) to the standby trunk fiber 30S (standby path PS). Meanwhile, the communication path between the OLT 10 and the ONU 20-1 remains the active trunk fiber 30N (normal path PN). The OLT 10 performs optical communication with each ONU 20 via the normal path PN or the standby path PS.

FIG. 10 illustrates the connection relationship information CON after the standby path activation processing in FIG. 9. The communication path information regarding each of the optical combining/splitting units 40-2 to 40-n is updated to "standby (the standby path PS including the standby trunk fiber 30S)". Further, because optical communication is normally performed via the standby path PS, the notification state information regarding each of the optical combining/splitting units 40-2 to 40-n is reset to "no abnormality notification". As described above, the information processing device 120 updates the connection relationship information CON stored in the memory 122 according to the standby path activation processing.

3-4. Failure Position Specification Processing after Standby Path Activation Processing Next, a case where a failure occurs on the standby path PS after the standby path activation processing will be considered. Also in this case, the failure position specification processing is executed by a method similar to the above-described method. However, the upstream direction toward the OLT 10 along the communication path in a case of the standby path PS is opposite to that in a case of the normal path PN. Regarding the optical combining/splitting unit 40-i in which the communication path is the normal path PN, the information processing device 120 sets the standard upstream direction as the upstream direction. Meanwhile, regarding the optical combining/splitting unit 40-i in which the communication path is the standby path PS, the information processing device 120 sets the standard downstream direction as the upstream direction.

Figure 11:
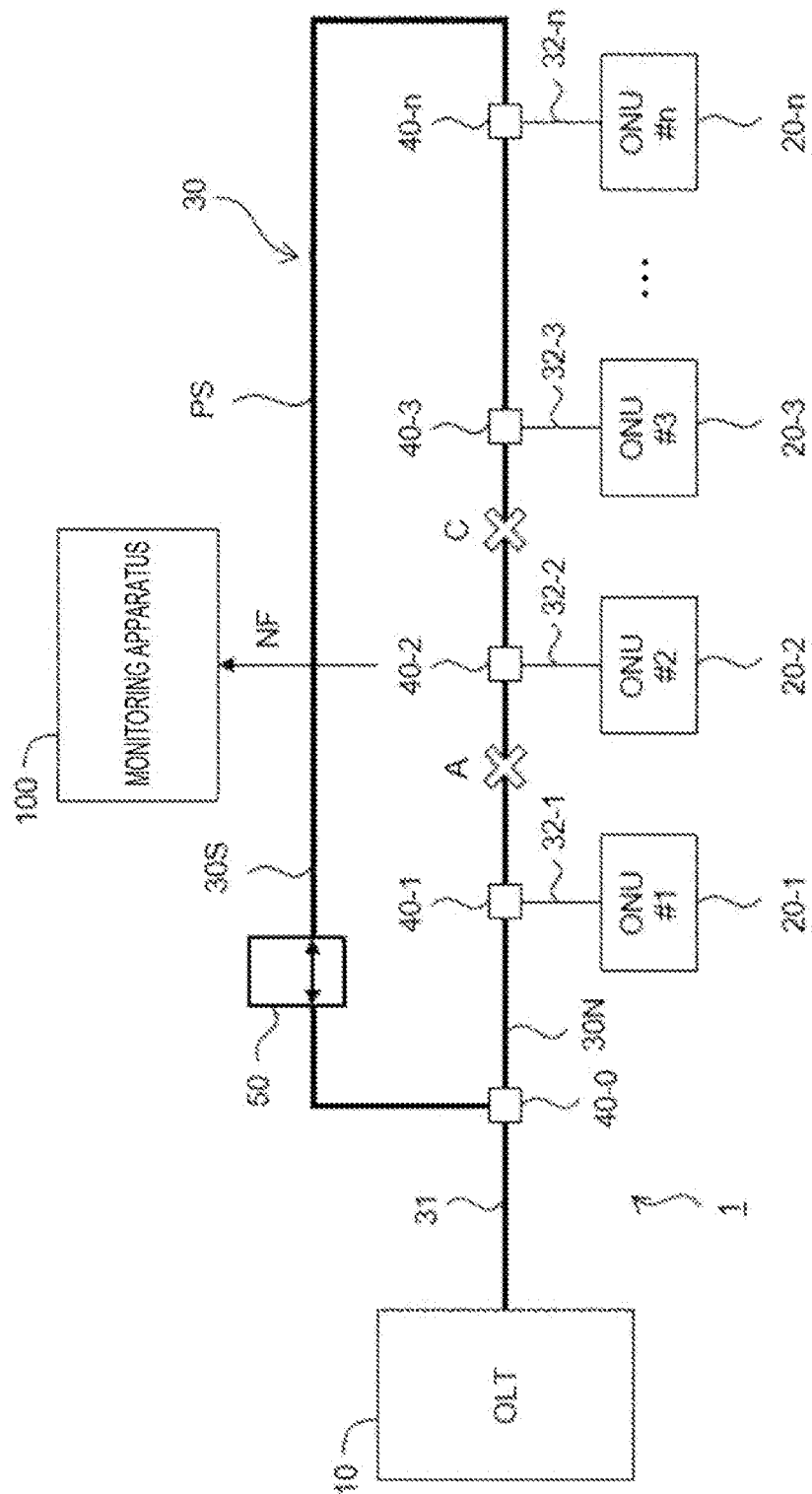
FIG. 11 is a conceptual diagram illustrating an example of failure position specification processing after standby path activation processing according to an embodiment of the present invention.

FIG. 11 is a conceptual diagram illustrating an example of the failure position specification processing after the standby path activation processing. In the above-described situation in FIG. 9, a failure further occurs at a point C between the optical combining/splitting unit 40-2 and an optical combining/splitting unit 40-3. In this case, the optical combining/splitting unit 40-2 detects the abnormality in optical communication and transmits the abnormality notification NF. Other optical combining/splitting units 40-i do not transmit the abnormality notification NF. As a result, the connection relationship information CON changes from the state in FIG. 10 to the state in FIG. 12.

The optical combining/splitting unit 40-2 exists in the most upstream position among the optical combining/splitting units 40 that have transmitted the abnormality notifications NF. Further, the optical combining/splitting unit 40-3 is adjacent to the optical combining/splitting unit 40-2 in the upstream direction. Note that the upstream direction is the standard downstream direction here because the communication path for the optical combining/splitting unit 40-2 is the standby path PS. The information processing device 120 can recognize the upstream direction on the basis of the communication path information (active, standby) in the connection relationship information CON. As illustrated in FIG. 12, the optical combining/splitting unit 40-3 (downstream optical combining/splitting unit) is adjacent to the optical combining/splitting unit 40-2 in the upstream direction (standard downstream direction).

Based on the abnormality notification NF and the connection relationship information CON, the information processing device 120 recognizes that the information processing device has received the abnormality notification NF from the optical combining/splitting unit 40-2 and has not received the abnormality notification NF from the optical combining/splitting unit 40-3. Therefore, the information processing device 120 determines that the failure position exists in a section between the optical combining/splitting unit 40-2 and the optical combining/splitting unit 40-3.

As described above, according to the present embodiment, regardless of whether the communication path is the normal path PN or the standby path PS, it is possible to recognize an optical combining/splitting unit 40 adjacent to a certain optical combining/splitting unit 40 in the upstream direction of the communication path. Therefore, regardless of whether the communication path is the normal path PN or the standby path PS, a failure position can be specified by a similar method.

3-5. Processing Flow

FIG. 13 is a flowchart showing processing performed by the information processing device 120 (processor 121) of the monitoring apparatus 100 according to the present embodiment.

In step S100, the information processing device 120 acquires connection relationship information CON and stores the connection relationship information CON in the memory 122. The connection relationship information CON is typically created and provided by a manager of the optical communication system 1. For example, the operator inputs the connection relationship information CON to the monitoring apparatus 100 by using the input/output device 130. In a case where a network configuration of the optical communication system 1 is updated, the operator may update (edit) the connection relationship information CON by using the input/output device 130.

In step S110, the information processing device 120 determines whether or not the information processing device has received an abnormality notification NF from at least one optical combining/splitting unit 40-$i$ via the communication device 110. In a case where the information processing device has received the abnormality notification NF (step s110; Yes), the processing proceeds to step S120. The abnormality notification NF includes the identification information of the optical combining/splitting unit 40-$i$ that has transmitted the abnormality notification NF.

In step S120, the information processing device 120 specifies a failure position on the communication path on the basis of the identification information of the optical combining/splitting unit 40-$i$ included in the received abnormality notification NF and the above-described connection relationship information CON.

More specifically, a "first optical combining/splitting unit" is an optical combining/splitting unit 40 existing in the most upstream position among at least one optical combining/splitting unit 40 that has transmitted the abnormality notification NF. The information processing device 120 can recognize the first optical combining/splitting unit on the basis of the abnormality notification NF and the connection relationship information CON. Then, the information processing device 120 determines that the failure position exists in the upstream direction from the first optical combining/splitting unit (see FIGS. 7, 8, and 11).

Further, a "second optical combining/splitting unit" is an optical combining/splitting unit 40 that is adjacent to the first optical combining/splitting unit in the upstream direction and does not transmit the abnormality notification NF. The information processing device 120 can recognize the second optical combining/splitting unit on the basis of the abnormality notification NF and the connection relationship information CON. In a case where both the first optical combining/splitting unit and the second optical combining/splitting unit are recognized, the information processing device 120 determines that the failure position exists between the first optical combining/splitting unit and the second optical combining/splitting unit (see FIGS. 7 and 11).

In step S130, the information processing device 120 outputs information regarding the failure position. For example, the information processing device 120 displays the information regarding the failure position on the display device of the input/output device 130. A maintenance operator can quickly handle a fault with reference to the failure position displayed on the display device. Further, the information processing device 120 may perform communication with the OLT 10 via the communication device 110 and provide the information regarding the failure position for the OLT 10. The OLT 10 may perform processing for handling the failure.

4. Effects

As described above, according to the present embodiment, the optical communication system 1 has a bus topology. More specifically, the optical communication system 1 includes the looped path 30 in which the active trunk fiber 30N and the standby trunk fiber 30S are connected in a loop. The plurality of optical combining/splitting units 40-$i$ is provided on the active trunk fiber 30N in series, and the plurality of slave devices 20-$i$ is connected to the plurality of optical combining/splitting units 40-$i$, respectively. The connection relationship information CON indicates a connection relationship between the plurality of optical combining/splitting units 40-$i$ along the active trunk fiber 30N.

Each optical combining/splitting unit 40-$i$ according to the present embodiment determines whether or not there is an abnormality in optical communication and transmits the abnormality notification NF to the monitoring apparatus 100 in a case where there is an abnormality in optical communication. The monitoring apparatus 100 specifies a failure position on the communication path on the basis of the abnormality notification NF and the connection relationship information CON. In this way, the failure position can be specified in a case where the communication failure occurs in the optical communication system 1 having the bus topology. Because the failure position is specified, it is possible to promptly handle a fault. That is, it is possible to early recover the optical communication system 1.

Further, according to the present embodiment, in a case where a failure occurs in the active trunk fiber 30N, the standby path PS including the standby trunk fiber 30S is also activated and becomes usable. Therefore, it is possible to early restart (recover) communication, without waiting restoration of the active trunk fiber 30N.

The upstream direction is switched depending on whether the communication path is the normal path PN or the standby path PS. The connection relationship information CON according to the present embodiment indicates a connection relationship among the optical combining/splitting units 40-$i$, 40-($i$−1), and 40-($i$+1). Therefore, regardless of whether the communication path is the normal path PN or the standby path PS, it is possible to recognize an optical combining/splitting unit 40 adjacent to a certain optical combining/splitting unit 40 in the upstream direction of the communication path. Therefore, regardless of whether the communication path is the normal path PN or the standby path PS, a failure position can be specified by a similar method.

REFERENCE SIGNS LIST

1 Optical communication system
10 Master device (OLT)
20 Slave device (ONU)
30 Looped path
30N Active trunk fiber
30S Standby trunk fiber
40 Optical combining/splitting unit
42 Optical fiber 43 Optical sensor
44 Transmitter
50 Optical switch
100 Monitoring apparatus
110 Communication device
120 Information processing device
121 Processor
122 Memory
41
CON Connection relationship information
NF abnormality notification

The invention claimed is:

1. An optical communication system comprising:
a looped path in which an active trunk fiber and a standby trunk fiber are connected in a loop;
a plurality of optical combining/splitting units provided on the active trunk fiber in series;
a plurality of slave devices connected to the plurality of optical combining/splitting units, respectively;
a master device connected to the looped path and configured to perform optical communication with each of the plurality of slave devices; and
a monitoring apparatus, wherein:
in a case where the active trunk fiber is normal, the standby trunk fiber is inactivated, and the active trunk fiber is used as a communication path of the optical communication;
in a case where a failure occurs in the active trunk fiber, the standby trunk fiber is activated, and the standby trunk fiber is also usable as the communication path of the optical communication;
each of the plurality of optical combining/splitting units includes
an optical fiber through which an optical signal passes,
an optical sensor configured to detect the optical signal passing through the optical fiber, and
a transmitter configured to determine whether or not there is an abnormality in the optical communication on the basis of a detection state of the optical signal and transmit an abnormality notification including identification information of the optical combining/splitting unit to the monitoring apparatus in a case where there is the abnormality in the optical communication; and
the monitoring apparatus includes
a memory configured to store connection relationship information indicating a connection relationship between the plurality of optical combining/splitting units along the active trunk fiber, and
a processor configured to, in a case where the processor receives the abnormality notification from at least one of the plurality of optical combining/splitting units, specify a failure position on the communication path on the basis of the identification information of each of the at least one optical combining/splitting unit that has transmitted the abnormality notification and the connection relationship information.

2. The optical communication system according to claim 1, wherein:
an upstream direction is a direction toward the master device along the communication path;
a first optical combining/splitting unit is an optical combining/splitting unit existing in the most upstream position among the at least one optical combining/splitting unit that has transmitted the abnormality notification; and
the processor determines that the failure position exists on an upstream side of the first optical combining/splitting unit on the basis of the connection relationship information.

3. The optical communication system according to claim 2, wherein:
a second optical combining/splitting unit is an optical combining/splitting unit that is adjacent to the first optical combining/splitting unit in the upstream direction and does not transmit the abnormality notification; and
the processor determines that the failure position exists between the first optical combining/splitting unit and the second optical combining/splitting unit on the basis of the connection relationship information.

4. The optical communication system according to claim 1, wherein:
a standard upstream direction is a direction toward the master device along the active trunk fiber;
a standard downstream direction is a direction away from the master device along the active trunk fiber;
the connection relationship information includes connection information regarding each of the plurality of optical combining/splitting units; and
the connection information regarding each of the optical combining/splitting units includes
the identification information of each of the optical combining/splitting units,
the identification information of an upstream optical combining/splitting unit adjacent to each of the optical combining/splitting units in the standard upstream direction, and
the identification information of a downstream optical combining/splitting unit adjacent to each of the optical combining/splitting units in the standard downstream direction.

5. The optical communication system according to claim 4, wherein:
the connection relationship information includes communication path information indicating whether or not the communication path is a standby path including the standby trunk fiber for each of the plurality of optical combining/splitting units;
regarding an optical combining/splitting unit in which the communication path is not the standby path, the processor sets the standard upstream direction as the upstream direction toward the master device along the communication path; and
regarding an optical combining/splitting unit in which the communication path is the standby path, the processor sets the standard downstream direction as the upstream direction toward the master device along the communication path.

6. The optical communication system according to claim 1, further comprising
an optical switch provided on the standby trunk fiber, wherein
in a case where the failure position on the active trunk fiber is specified in a state in which the standby trunk fiber is inactivated, the processor activates the standby trunk fiber by operating the optical switch so as to permit passing of the optical signal.

7. A monitoring apparatus in an optical communication system, wherein:
the optical communication system includes
a looped path in which an active trunk fiber and a standby trunk fiber are connected in a loop, a plurality of optical combining/splitting units provided on the active trunk fiber in series, a plurality of slave devices connected to the plurality of optical combining/splitting units, respectively, and a master device connected to the looped path and configured to perform optical communication with each of the plurality of slave devices;

in a case where the active trunk fiber is normal, the standby trunk fiber is inactivated, and the active trunk fiber is used as a communication path of the optical communication;

in a case where a failure occurs in the active trunk fiber, the standby trunk fiber is activated, and the standby trunk fiber is also usable as the communication path of the optical communication;

each of the plurality of optical combining/splitting units includes an optical fiber through which an optical signal passes, an optical sensor configured to detect the optical signal passing through the optical fiber, and a transmitter configured to determine whether or not there is an abnormality in the optical communication on the basis of a detection state of the optical signal and transmit an abnormality notification including identification information of the optical combining/splitting unit to the monitoring apparatus in a case where there is the abnormality in the optical communication; and the monitoring apparatus includes a memory configured to store connection relationship information indicating a connection relationship between the plurality of optical combining/splitting units along the active trunk fiber, and a processor configured to, in a case where the processor receives the abnormality notification from at least one of the plurality of optical combining/splitting units, specify a failure position on the communication path on the basis of the identification information of each of the at least one optical combining/splitting unit that has transmitted the abnormality notification and the connection relationship information.

8. A monitoring method executed by a computer in an optical communication system, wherein:

the optical communication system includes a looped path in which an active trunk fiber and a standby trunk fiber are connected in a loop, a plurality of optical combining/splitting units provided on the active trunk fiber in series, a plurality of slave devices connected to the plurality of optical combining/splitting units, respectively, and a master device connected to the looped path and configured to perform optical communication with each of the plurality of slave devices;

in a case where the active trunk fiber is normal, the standby trunk fiber is inactivated, and the active trunk fiber is used as a communication path of the optical communication;

in a case where a failure occurs in the active trunk fiber, the standby trunk fiber is activated, and the standby trunk fiber is also usable as the communication path of the optical communication;

each of the plurality of optical combining/splitting units includes an optical fiber through which an optical signal passes, an optical sensor configured to detect the optical signal passing through the optical fiber, and a transmitter configured to determine whether or not there is an abnormality in the optical communication on the basis of a detection state of the optical signal and transmit an abnormality notification including identification information of the optical combining/splitting unit to the monitoring apparatus in a case where there is the abnormality in the optical communication; and the monitoring method includes a step of acquiring connection relationship information indicating a connection relationship between the plurality of optical combining/splitting units along the active trunk fiber, a step of receiving the abnormality notification from at least one of the plurality of optical combining/splitting units, and a step of specifying a failure position on the communication path on the basis of the identification information of each of the at least one optical combining/splitting unit that has transmitted the abnormality notification and the connection relationship information.

* * * * *